United States Patent
Sawai et al.

(10) Patent No.: US 7,452,489 B2
(45) Date of Patent: Nov. 18, 2008

(54) CONDUCTIVE MATERIAL, METHOD OF PRODUCING THE SAME, VISUAL DISPLAY DEVICE, AND GLASS SPACER THEREOF

(75) Inventors: Yuichi Sawai, Mito (JP); Osamu Shiono, Hitachi (JP); Takashi Namekawa, Hitachi (JP); Takashi Naitou, Funabashi (JP); Mitsuo Hayashibara, Hitachinaka (JP); Hiroshi Ito, Chiba (JP); Akira Hatori, Chiba (JP); Nobuhiko Hosotani, Mobara (JP)

(73) Assignee: Hitachi Displays, Ltd., Mobara-shi (JP)

( * ) Notice: Subject to any disclaimer, the term of this patent is extended or adjusted under 35 U.S.C. 154(b) by 7 days.

(21) Appl. No.: 11/755,951

(22) Filed: May 31, 2007

(65) Prior Publication Data

US 2007/0278454 A1 Dec. 6, 2007

(30) Foreign Application Priority Data

Jun. 2, 2006 (JP) ............................. 2006-154867

(51) Int. Cl.
*H01B 1/08* (2006.01)
*G02B 7/00* (2006.01)
(52) U.S. Cl. .................... 252/520.4; 156/325; 359/503; 313/238

(58) Field of Classification Search ............. 252/520.4; 156/325; 359/503; 313/238
See application file for complete search history.

(56) References Cited

U.S. PATENT DOCUMENTS

| | | | | |
|---|---|---|---|---|
| 3,278,317 A | * | 10/1966 | Blair et al. | 501/46 |
| 3,950,176 A | * | 4/1976 | Deeg et al. | 501/46 |
| 4,279,785 A | * | 7/1981 | Stewart et al. | 252/519.3 |
| 4,342,943 A | * | 8/1982 | Weaver | 313/479 |
| 6,103,648 A | * | 8/2000 | Yi | 501/46 |

FOREIGN PATENT DOCUMENTS

| | | |
|---|---|---|
| JP | 63-502583 | 9/1988 |
| JP | 02-267137 | 10/1990 |
| JP | 2004-250276 | 9/2004 |
| WO | WO 87/05006 | 8/1987 |

* cited by examiner

*Primary Examiner*—Mark Kopec
(74) *Attorney, Agent, or Firm*—Antonelli, Terry, Stout & Kraus, LLP.

(57) ABSTRACT

A conductive material comprising a $V_2O_5$—$P_2O_5$ glass and a second phase dispersed in the $V_2O_5$—$P_2O_5$ glass, wherein the second phase contains a crystalline V and O compound and a crystalline metal phosphate compound. The crystalline V and O compound is at least one of $V_2O_5$, $V_4O_9$, $V_2O_4$, and $V_2O_3$. The metal phosphate compound is a phosphate compound of transition metal or alkaline-earth metal. In a visual display device, glass spacers are bonded to glass panels with the conductive material.

15 Claims, 7 Drawing Sheets

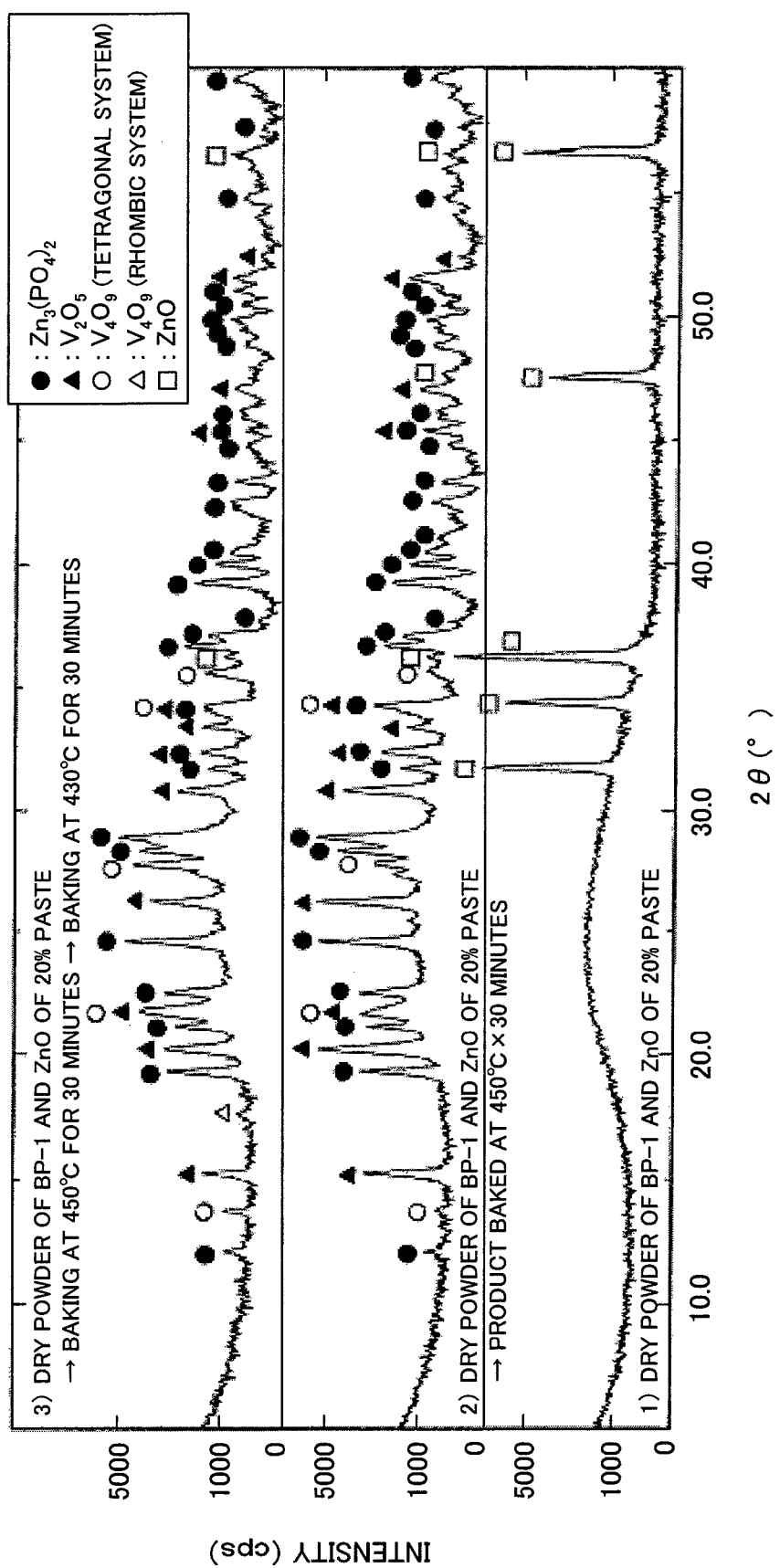

CONDUCTIVE MATERIAL, METHOD OF PRODUCING THE SAME, VISUAL DISPLAY DEVICE, AND GLASS SPACER THEREOF

CLAIM OF PRIORITY

The present application claims priority from Japanese application serial no. 2006-154867, filed on Jun. 2, 2006, the contents of which are hereby incorporated by references into this application.

FIELD OF THE INVENTION

The present invention relates to a conductive material such as conductive glass used as an adhesive material to bond glass parts. The present invention also relates to a visual display device and a glass spacer wherein the conductive material is used to bond a glass panel and a glass spacer.

BACKGROUND ART

In some electronic equipment, an adhesive material to bond glass parts is required to be conductive. For example, in a visual display device that uses glass spacers as supporting members between a glass panel with electron sources and a glass panel with fluorescent elements that emit light when receiving electrons from the electron sources, the adhesive materials to bond glass spacers to glass panels are required to be electrically conductive.

A representative glass material used for bonding is $V_2O_5$—$P_2O_5$ glass that contains $V_2O_5$ and $P_2O_5$ as the main components (see Japanese Patent Laid-open No. Sho 63(1988)-502583, Japanese Patent Laid-open 2004-250276, and Japanese Patent Laid-open No. Hei 2(1990)-267137).

Patent literature 1 (Japanese Patent Laid-open No. Sho 63(1988)-502583) discloses a glass material that contains ZnO, BaO, SrO and other metal oxides as glass components and is mixed with a filler made of fine-ceramic particles such as a V-group metal oxide whose coefficient of thermal expansion is low. Patent literature 2 (Japanese Patent Laid-open 2004-250276) discloses a mixture of glass that contains $V_2O_5$ as the main component and ceramic filler of low coefficient of thermal expansion as the second phase. Patent literature 3 (Japanese Patent Laid-open No. Hei 2(1990)-267137) discloses a mixture of low-melting-point glass that contains $V_2O_5$ as the main component and filler of low coefficient of thermal expansion as the second phase.

However, the above patent literatures 1 to 3 do not refer to application of conductivity to the glass materials.

SUMMARY OF THE INVENTION

An object of the present invention is to provide a $V_2O_5$—$P_2O_5$ conductive material and a method of producing the conductive material. Furthermore, the present invention is to provide a glass spacer and a visual display device that uses the conductive material to bond glass spacers to glass panels.

The present invention provides a conductive material comprising a $V_2O_5$—$P_2O_5$ glass with $V_2O_5$ and $P_2O_5$ as the main components and a second phase dispersed in the $V_2O_5$—$P_2O_5$ glass, wherein the second phase contains a crystalline V and O compound and a crystalline metal phosphate compound.

The present invention also provides a method of producing a conductive material with a crystalline V and O compound and a crystalline metal phosphate compound, by mixing $V_2O_5$—$P_2O_5$ glass containing $V_2O_5$ and $P_2O_5$ as main components with metal oxide combined with phosphoric acid and heating such a mixture.

The present invention also provides a visual display device comprising a glass panel with electronic sources, a glass panel with fluorescent material that emits light when receiving electrons emitted from the electron sources, and glass spacers which provide spaces between the glass panels; wherein the glass spacers are bonded to the glass panels with a conductive material containing a $V_2O_5$—$P_2O_5$ glass and a second phase dispersed in the $V_2O_5$—$P_2O_5$ glass; and wherein the second phase contains a crystalline V and O compound and a crystalline metal phosphate compound.

The present invention provides glass spacers for a visual display device, which is interposed between a glass panel with electron sources and a glass panel with fluorescent material that emits light when receiving electrons emitted from the electron sources; wherein the glass spacer is bonded to the glass panels with a conductive material comprising a $V_2O_5$—$P_2O_5$ glass and a second phase dispersed in the $V_2O_5$—$P_2O_5$ glass; and wherein the second phase contains a crystalline V and O compound and a crystalline metal phosphate compound.

BRIEF DESCRIPTION OF THE DRAWINGS

FIG. 2(*b*) is an approximate sectional view taken on line A-A of FIG. 2(*b*).

FIG. 5 is a graph showing X-ray diffraction patterns.

DETAILED DESCRIPTION OF THE INVENTION

Figure 1:
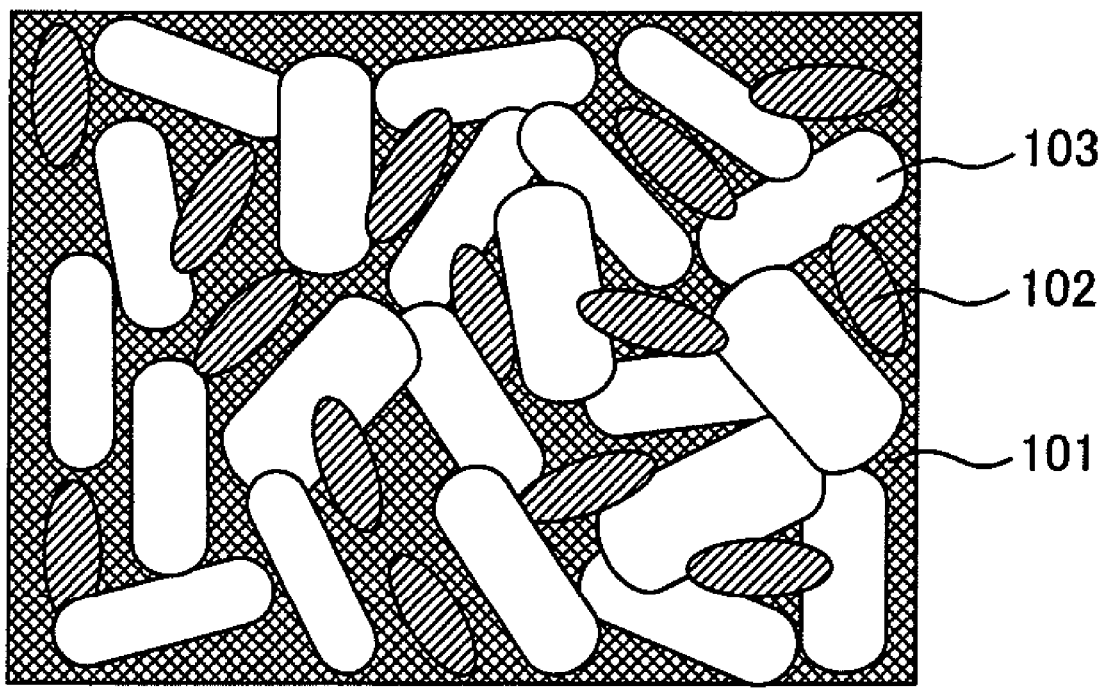
FIG. 1 is a pattern diagram of composition of the conductive material of the present invention.

A conductive material of the present invention comprises a $V_2O_5$—$P_2O_5$ glass (as the base material) with $V_2O_5$ and $P_2O_5$ as the main components and a second phase with a crystalline V and O compound and a crystalline metal phosphate compound dispersed in the base material. The crystalline V and O compound is conductive and the crystals conduct electricity. Therefore, the crystalline V and O compound gives conductivity to the glass composition. Further, the conductive material has an effect that the produced metal phosphate compound suppresses phosphor from dissolving from the glass composition.

The conductive material with a crystalline V and O compound and a crystalline metal phosphate compound can be produced by mixing $V_2O_5$—$P_2O_5$ glass and metal oxide combined with phosphoric acid, and heating such a mixture. The crystalline metal phosphate compound is a reaction product of the metal and phosphoric acid. In production of the conductive material, it is important to mix glass material with metal oxide combined with phosphoric acid. This can produce and deposit a crystalline compound that contains V and O. The above-mentioned metal oxide, which is combined with phosphoric acid, is used as the starting material in the production of a glass matrix. If the metal oxide combined with phosphoric acid is dissolved together with the other starting glass material at the same time, the crystalline compound which contains V and O cannot be obtained. However, in production of the conductive material, the reaction of metal oxide (combined with phosphoric acid) to the phosphoric acid has precedence over the reaction of $V_2O_5$ to the phosphoric acid. Therefore, the reaction of $V_2O_5$ and phosphoric acid can be suppressed, and the crystalline V and O compound can be deposited in a glass material. Furthermore the crystalline metal phosphate which is the reaction product of metal and phosphoric acid can be deposited as the second phase.

Since the reaction of metal oxide (to be used for production of conductive material) to phosphoric acid must have precedence over the reaction of $V_2O_5$ to phosphoric acid, the metal oxide is preferably the oxide of transition metal or alkaline-earth metal and more particularly, the oxide of at least one of Zn, Mg, Ca, Ba, Zr, W, Mo, and Fe.

The crystalline V and O compound is preferably vanadium oxide. Therefore, in this embodiment, the method of producing a conductive material in accordance with the present invention produces vanadium oxide. Vanadium oxide produced by this method is at least one of $V_4O_9$, $V_2O_4$, $V_2O_3$, and $V_2O_5$. Among these vanadium oxides, $V_4O_9$ and $V_2O_4$ particularly excel in conductivity.

The rate of the crystalline V and O compound in the conductive material is preferably within the range of 10 to 50% by volume. In this range, the compound can have higher conductivity since the compound contains more crystal particles having vanadium ions that work as hopping carriers. A conductivity of the conductive material can be controlled by the rate (quantity) of the crystalline V and compound in the conductive material. The quantity of the crystalline V and O compound also can be controlled by the composition of the glass base material and the quantity of the metal oxide to be mixed in production of the conductive material.

It is also preferable that the rate of the metal phosphate compound to be deposited as the second phase in the conductive material is within the range of 10 to 50% by volume.

The rate of $V_2O_5$ in the $V_2O_5$—$P_2O_5$ glass is preferably 50 to 70% by weight and the rate of $P_2O_5$ in the glass is preferably 20 to 40% by weight. In such ranges, the electron hopping conductivity can be obtained among different vanadium ions.

FIG. 1 shows a pattern diagram of composition of the conductive material of the present invention. Compound phase 102 with V and O metal, and phosphate compound phase 103 are deposited in $V_2O_5$—$P_2O_5$ glass base material 101.

Figure 2A:
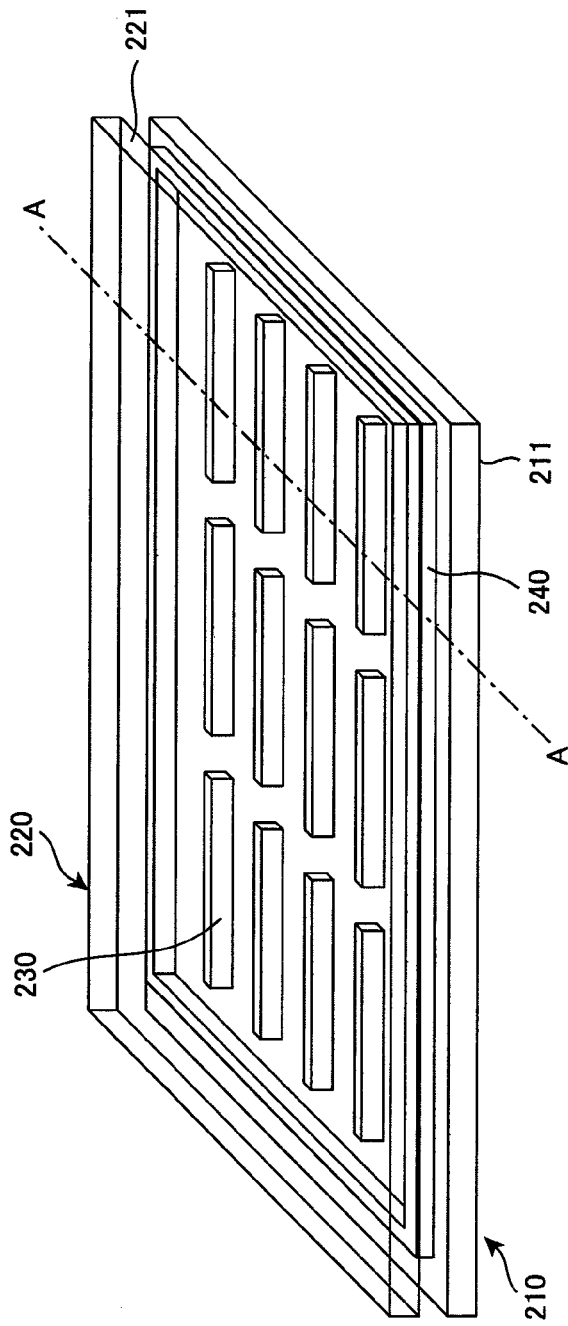
FIG. 2(*a*) is a perspective view of the structure of a field emission display (FED).
Figure 2B:
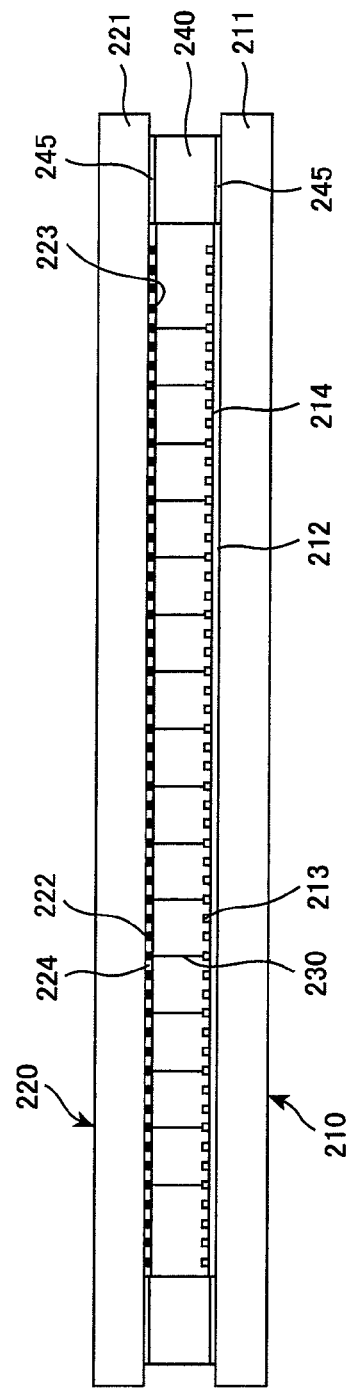
Figure 3:
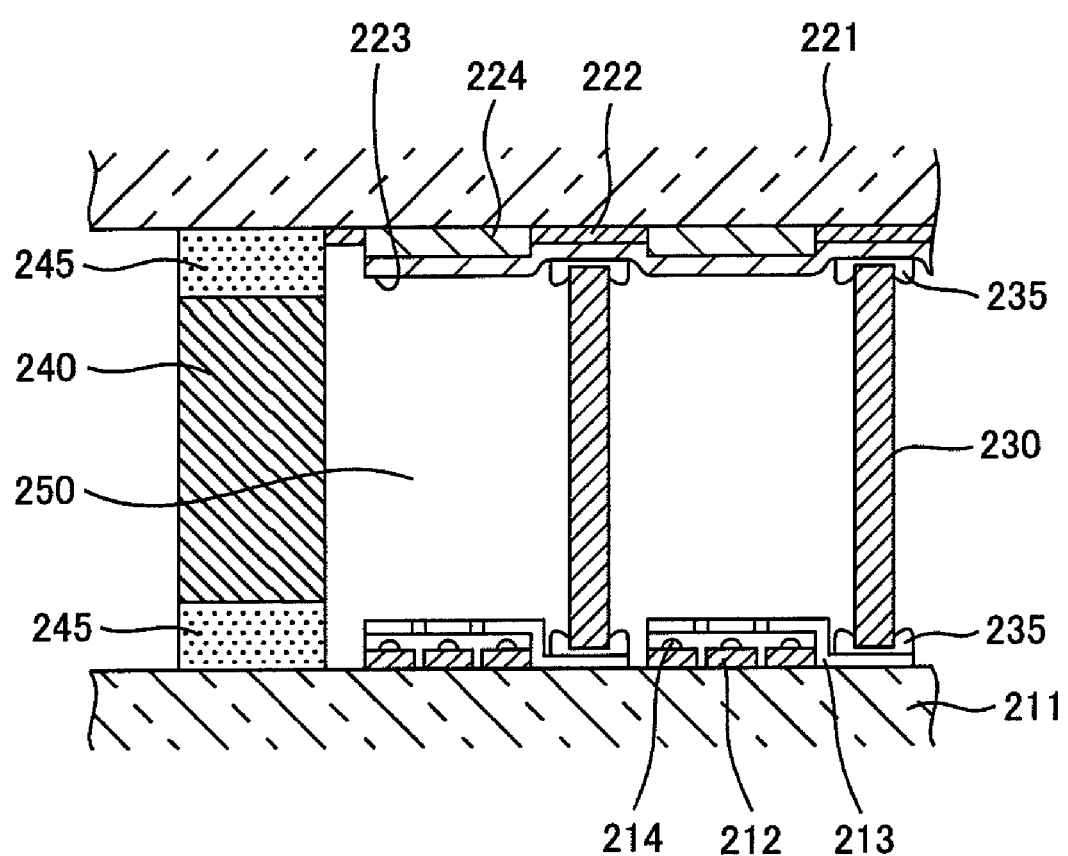
FIG. 3 is a magnified sectional view of one part taken on line A-A of FIG. 2(*a*).

Referring to FIG. 2 and FIG. 3, below will be explained a field emission display (FED) as an example of electronic equipment that uses the conductive material of the present invention as a bonding material.

FIG. 2(a) is a perspective view of the structure of a field emission display (FED). FIG. 2(b) is an approximate sectional view taken on line A-A of FIG. 2(b). FIG. 3 is a magnified sectional view of one part taken on line A-A of FIG. 2(a).

As shown in FIG. 2 and FIG. 3, the FED comprises a front glass panel 220, a rear glass panel 210, a frame glass 240, and glass spacers 230 as supporting members between a rear glass panel 210 and a front glass panel 220 and around a frame glass 240. The rear glass panel 210 has signal lines (data lines and cathode electrode lines) 212 and scanning lines (gate electrode lines) 213 on the internal surface of a rear substrate 211 and electron sources 214 near intersections of signal lines and scanning lines. The front glass panel 220 has each light-shielding layer (black matrix) 222, anode (metal back) 223, and fluorescent material layer 224 on the internal surface of front substrate 221, corresponding to each of pixels.

The frame glass 240 is bonded to each of insulating layers (not shown in the figure), which are formed on the internal surface of respective front and rear substrates, with a glass seal material. Each of the bonding parts is a seal adhesive layer 245. With the frame glass 240, a space of 3 to 5 mm high is formed between the front and rear glass panels. This space portion is usually kept in a vacuum status of about $10^{-5}$ to $10^{-7}$ Torr and works as display 250. Each of Glass spacers 230 is interposed between each scanning line 213 on the internal surface of the rear substrate 211 and each light shielding layer (black matrix) 222 on the internal surface of the front substrate 221. Each spacer 230 is bonded each scanning line 213 and each light shielding layer with conductive material of the present invention. This bonding part is a conductive adhesive layer 235.

When a voltage is applied between the electron sources and anodes in the FED, electron beams are emitted from the cathode side to the anode side, accelerated by an acceleration voltage, hit and excite the fluorescent material layer 224. As the result, light of a predetermined frequency is emitted to the outside of glass panel 220. The emitted light forms an image. However, when a voltage is applied, the glass spacers are apt to charge. The glass spacers consequently are prone to discharge, thereby cathodes and other structural parts may be damaged. Charges on the glass spacers also will deflect electron beams so as to attract them to the spacers or drive them away from the spacers. Further, when electron beams are deflected, spacer shadows will appear on the image, so that quality of the image is deteriorated.

The deflection of electron beams can be prevented by the conductive material in accordance with the present invention used for conductive adhesive layer 235. Incidentally, it is assumed that the other method can also apply conductivity to the adhesive layer by mixing the glass base material with metal powder. This method uses the conductivity of the metal to make the adhesive layer conductive. In this method, however, metal particles are settled down when the adhesive layer is melted by heat of bonding process since the specific gravity of metal is greater than the glass base material. As the result, metal powders are not dispersed evenly (unevenness in distribution of metal powder) and some portions are not conductive. Necessarily, this material cannot prevent deflection of electron beams. Accordingly, it is necessary that the conductive phase disperses evenly to prevent deflection of electron beams. This can be accomplished by the present invention.

In assembly of the FED, it is preferable that a layer of the conductive material of the present invention is formed, by application or other method, on the whole surface of respective spacers or areas at which glass spacers are bonded to the glass panels. Further, it is preferable that the glass transition point of the conductive material for bonding one end of the glass spacer to one glass panel side is not equal to the glass transition point of the conductive material for bonding the other end of the glass spacer to another glass panel side. Further, it is preferable that the electric resistivity of the conductive material is in the range of 10 Ωcm or more but not exceeding $10^9$ Ωcm. In accordance with the present invention, the electric resistivity of the conductive material can be controlled within the above range by controlling the rate of metal oxide to be mixed with the conductive material to be produced.

EMBODIMENT 1

For this embodiment, we first tested the $V_2O_5$—$P_2O_5$ glass base materials. We mixed raw materials of compositions given in Table 1, put them respectively in a platinum crucible, and melted the mixtures in open air. Set up temperatures to melt glasses are listed in Table 1. After taking out distortion from each of the molten glasses, we measured the coefficient of thermal expansion of each glass and evaluated their DTA characteristic temperatures. Table 2 lists the result of measurement of thermal expansion coefficients and DTA characteristics of the glasses. In Table 2, Tg, Mg, Ts, and Tf respectively indicate glass transition point, breakdown point, softening point, and current point in this order.

TABLE 1

| Glass No. | Composition (% by weight) | | | | | | | Ser up temperature for melt (° C.) |
|---|---|---|---|---|---|---|---|---|
| | $V_2O_5$ | $P_2O_5$ | BaO | $WO_3$ | $Sb_2O_3$ | SrO | MgO | |
| BP-1 | 62 | 25 | 5 | 3 | 5 | 0 | 0 | 1000 |
| BP-2 | 62 | 25 | 5 | 0 | 5 | 3 | 0 | 1000 |
| BP-3 | 62 | 25 | 5 | 0 | 5 | 0 | 3 | 1000 |

Then, we measured X-ray diffraction patterns of a sample that was prepared by baking the powder mixture of BP-1 and ZnO of 20% at 450° C. for 30 minutes and a sample that was prepared by baking the same sample at 430° C. for 30 minutes and evaluated the difference in their crystal phases due to thermal history.

FIG. 5 shows X-ray diffraction patterns of samples. As seen from FIG. 5, the X-ray diffraction peaks obtained from baked samples mainly contain broad peaks (halo) of amorphous component and peaks of $Zn_3(PO_4)_2$ and $V_2O_5$. We can also see diffraction peaks of $V_4O_9$ (tetragonal) and ZnO. In other words, diffraction patterns of FIG. 5 show that a trace quantity of ZnO is present. The diffraction pattern of a sample that was baked twice contains a peak of $V_4O_9$ (rhombic system) besides peaks of the above components. It is assumed that some ZnO still remains in the sample. In other words, the result of the X-ray diffraction patterns matches the result of DTA evaluation of FIG. 4. It indicates that BP-1 and ZnO of 20% almost complete crystallization by baking at 450° C. for 30 minutes. If all ZnO reacts, it is assumed (by calculation) that approx. 58% of $P_2O_5$ in BP-1 is used for production of the compound.

We evaluated specific resistances, coefficients of thermal expansion, glass transition points, and crystallization tem-

TABLE 2

| Glass No. | Result of DTA measurement | | | | | | Thermal expansion characteristic | | |
|---|---|---|---|---|---|---|---|---|---|
| | Tg (° C.) | Mg (° C.) | Ts (° C.) | Tf (° C.) | Crystallization temperature | Crystallization peak temperature | α (250) | $T_g$ (° C.) | $D_g$ (° C.) |
| BP-1 | 325 | 345 | 405 | 455 | 480 | 525 | 76 | 325 | 355 |
| BP-2 | 332 | 352 | 413 | 464 | 460 | 520 | 78 | 330 | 365 |
| BP-3 | 319 | 338 | 397 | 446 | 475 | 525 | 73 | 325 | 355 |

After the above discussion, we produced a conductive crystal phase in the BP-1 glass (vanadate-phosphate glass as the base glass) of the highest crystallization temperature, thereby crystallized the glass, and gave the high conductivity to the glass. This embodiment used ZnO as the oxide that reacts to phosphor in the vanadate-phosphate glass and deposits as a phosphate compound.

Figure 4A:
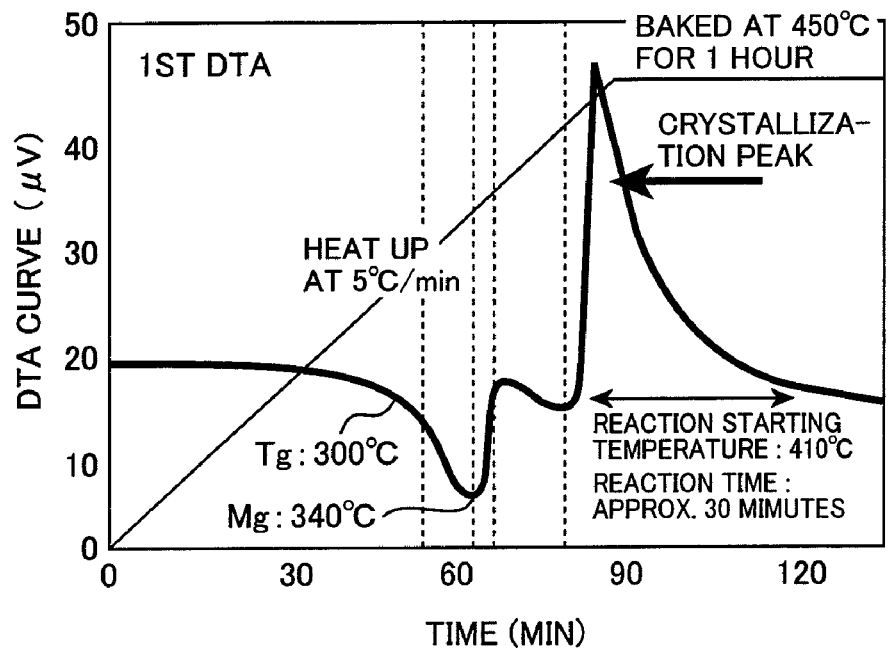
FIG. 4 is a graph showing the result of DTA evaluation of the powder mixture of glass base material and ZnO.
Figure 4B:
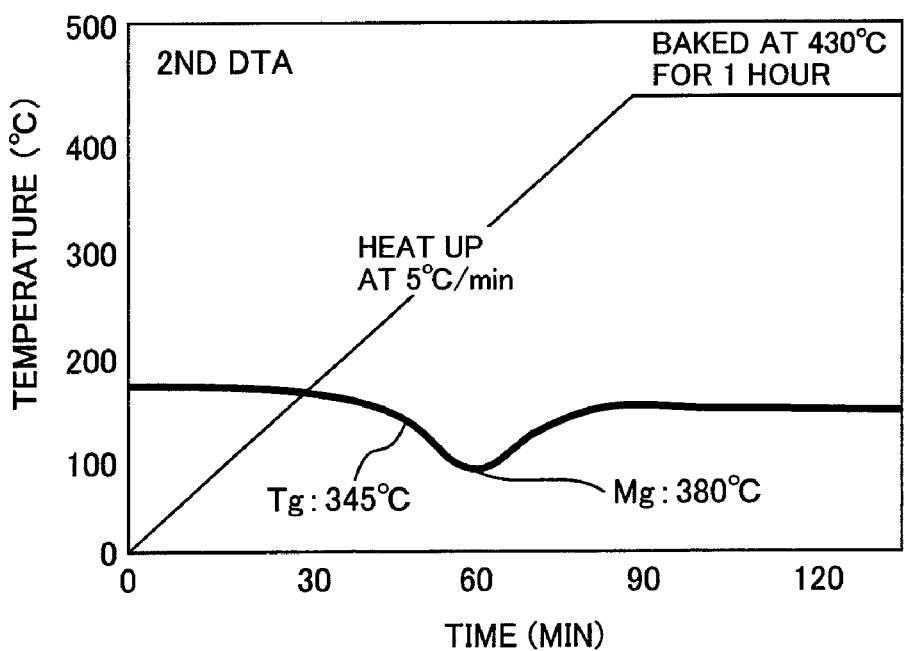

We first evaluated DTA of the mixture of BP-1 and ZnO and measured its crystallization temperature. FIG. 4(a) and FIG. 4(b) show the result of DTA evaluation of the powder mixture of BP-1 and ZnO of 20%. FIG. 4(a) is the result of DTA evaluation of the mixture that was kept at 450° C. for one hour. FIG. 4(b) is the result of DTA evaluation of the same sample that was kept at 430° C. for one hour after the above DTA evaluation.

From the result of the evaluation, we found that the powder mixture of BP-1 and ZnO of 20% starts the crystallization reaction from approx. 410° C. Further, we found that it took approx. 30 minutes for crystallization while the mixture is held at 450° C. and that the crystallization will not proceed any more after that. This means that addition of ZnO causes the crystallization to perform at a temperature lower than the original crystallization temperature (480° C.) of BP-1 base material.

peratures as to samples that are prepared by adding 10 to 20 wt % of ZnO to BP-1. The results are listed in FIG. 6 and FIG. 7.

Figure 6:
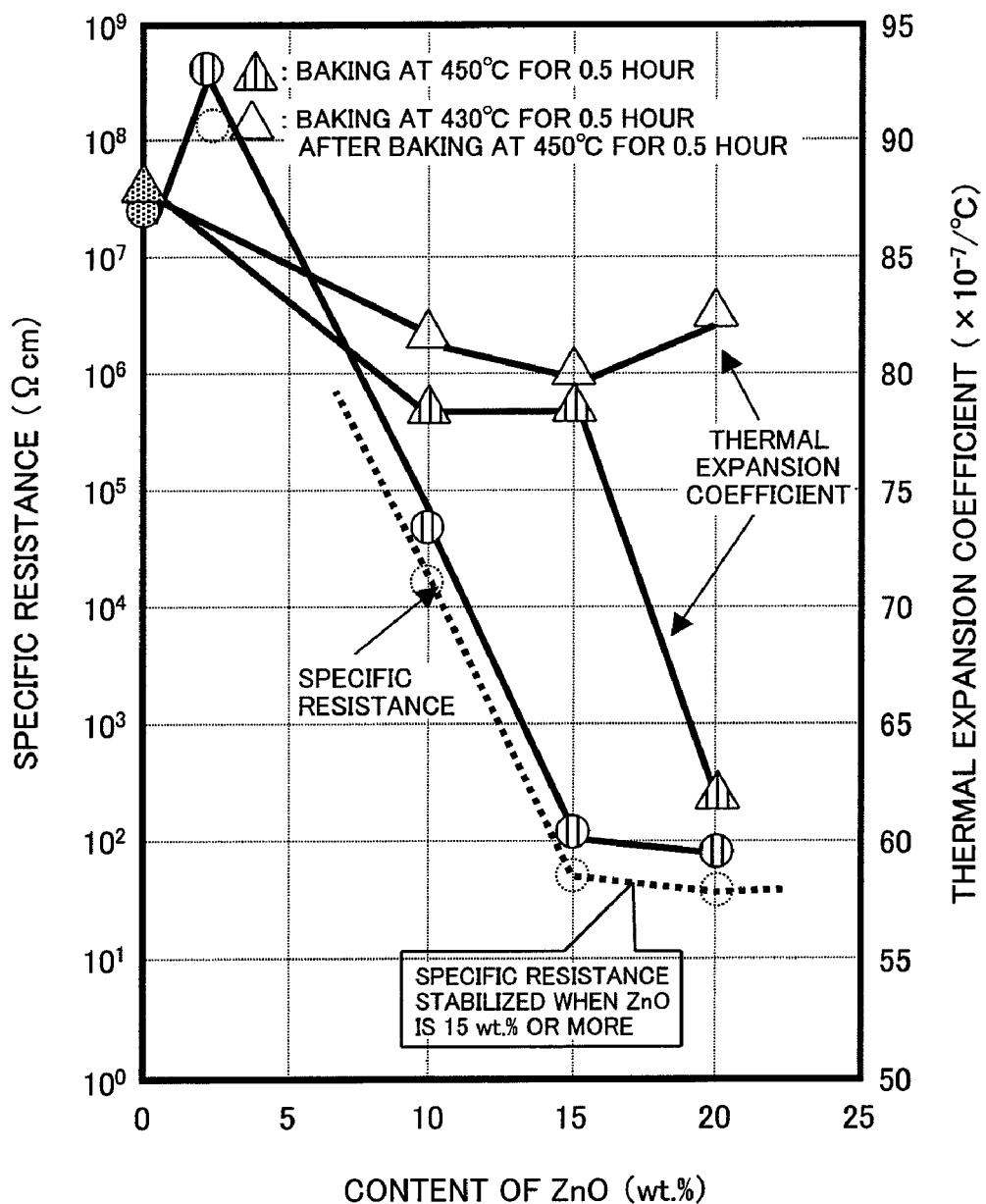
FIG. 6 is a graph showing specific resistances and thermal expansion coefficients of samples prepared by adding ZnO to glass base material.
Figure 7:
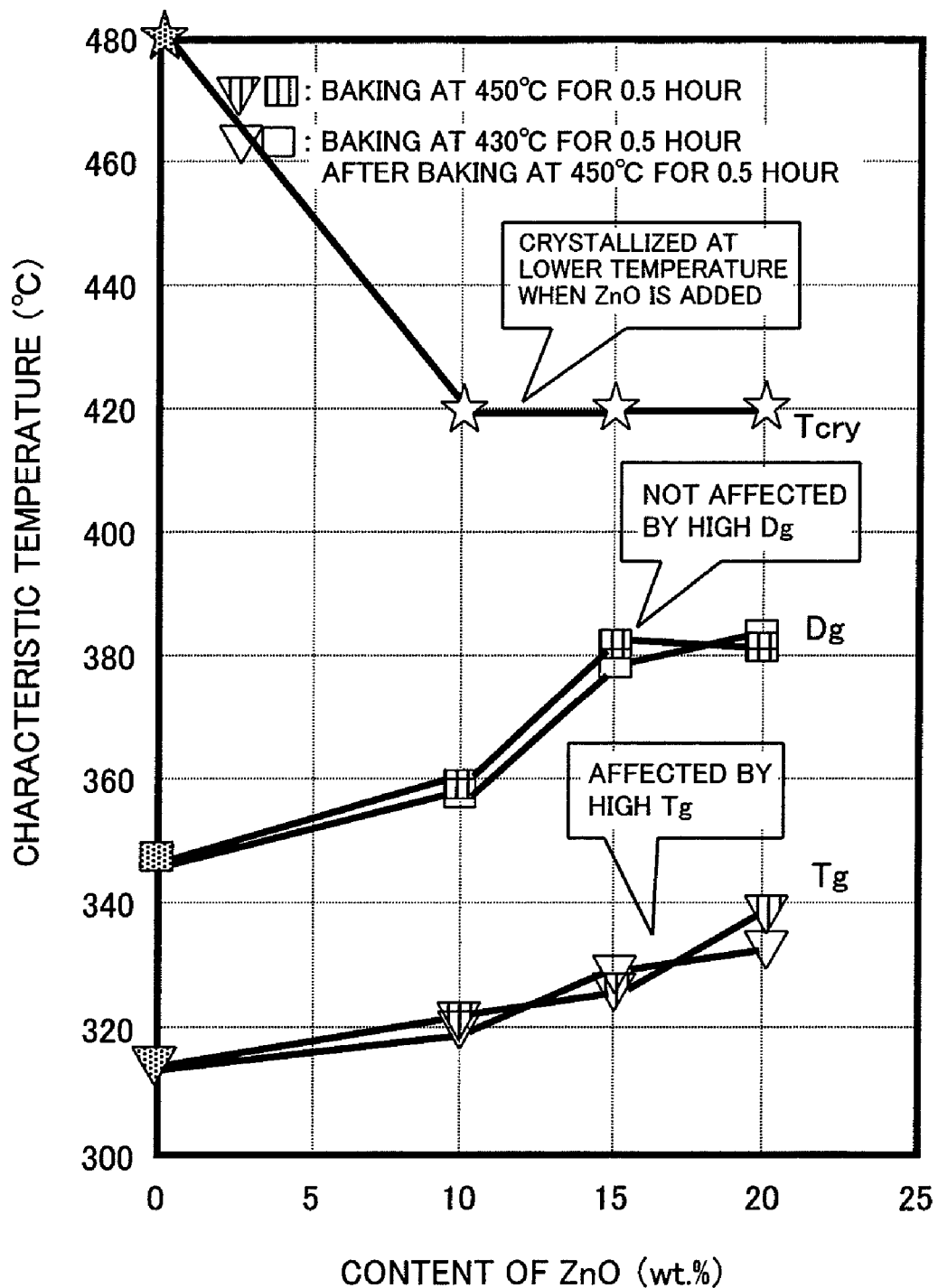
FIG. 7 is a graph showing glass transition points and crystallization temperatures of samples prepared by adding ZnO to glass base material.

As seen from FIG. 6 and FIG. 7, when the rate of added ZnO is in the range of 15 to 20 wt %, the electric and thermal characteristics of BP-1 are comparatively stable and the lowest specific resistance is $10^2$ Ωcm. When the recommended quantity of ZnO is added, BP-1 can have a coefficient of thermal expansion that is close to a target value.

We tested whether the quantity of added ZnO will vary the crystallization temperature of the product. The result of the test is listed in Table 3. Here, we checked the effect of addition of ZnO on the crystallization temperature of powder mixtures of BP-1 and ZnO by DTA evaluation. We measured the crystallization temperatures of frits prepared by adding ZnO of 10, 15, and 20 wt % to BP-1. As a result of the measurement, we found that the crystallization starting temperature of BP-1 does not depend upon the quantity of ZnO in the range of 10 to 20 wt %. In other words, the electric resistivity of a frit that contains BP-1 and ZnO can be controlled without changing the crystallization temperature.

TABLE 3

| | Composition (wt. %) | | DTA crystallization characteristic (° C.) | | Baking at 450° C. for 0.5 hour | | | | |
|---|---|---|---|---|---|---|---|---|---|
| | BP glass | Conductive filler [ZnO] | Starting temperature | Peak temperature | Specific resistance (Ωcm) | Coefficient of thermal expansion (/° C.) | Tg (° C.) | Dg (° C.) | Crystals detected by X-ray diffraction |
| BP-01Z10 | BP-01 | 90 | 10 | 420 | 455 | $4.7 \times 10^4$ | $78 \times 10^{-7}$ | 320 | 358 | |
| BP-01Z15 | BP-01 | 85 | 15 | 420 | 445 | $1.1 \times 10^2$ | $78 \times 10^{-7}$ | 326 | 381 | |
| BP-01Z20 | BP-01 | 80 | 20 | 420 | 450 | 76 | $62 \times 10^{-7}$ | 339 | 380 | $Zn_3(PO_4)_2, V_2O_5, V_4O_9$ |

* The temperature range for measurement of thermal expansion coefficients is RT to 300° C. Tg and Dg are glass transition temperature and glass deformation temperature in measurement of thermal expansion coefficients.

EMBODIMENT 2

Embodiment 2 is the same as Embodiment 1 but Embodiment 2 uses any other oxides than ZnO. The result of evaluation of Embodiment 2 is listed in Table 4.

TABLE 4

| | Baking at 420° C. | | Baking at 450° C. | | Baking at 480° C. | |
|---|---|---|---|---|---|---|
| Metal oxide | Electric resistivity (Ωcm) | Crystalline phase | Electric resistivity (Ωcm) | Crystalline phase | Electric resistivity (Ωcm) | Crystalline phase |
| Zn | $10^3$ | $Zn_3(PO_4)_2, V_2O_5, V_4O_9$ | $10^3$ | $Zn_3(PO_4)_2, V_2O_5, V_4O_9$ | $10^2$ | $Zn_3(PO_4)_2, V_2O_5, V_4O_9, V_2O_4$ |
| Mg | $10^8$ | MgO | $10^8$ | MgO | $10^4$ | $Mg_3(PO_4)_2, V_2O_5, V_4O_9$ |
| Ti | $10^8$ | $TiO_2$ | $10^8$ | $TiO_2$ | $10^8$ | $TiO_2$ |
| Ca | $10^8$ | CaO | $10^3$ | $CaO_3(PO_4)_2, V_2O_5, V_4O_9$ | $10^2$ | $CaO_3(PO_4)_2, V_2O_5, V_4O_9$ |
| Ba | $10^8$ | BaO | $10^3$ | $Ba_3(PO_4)_2, V_2O_5, V_4O_9$ | $10^2$ | $Ba_3(PO_4)_2, V_2O_5, V_4O_9$ |
| Zr | $10^8$ | $ZrO_2$ | $10^8$ | $ZrO_2$ | $10^4$ | $ZrP_2O_7, V_2O_5$ |
| W | $10^8$ | $WO_3$ | $10^4$ | $(WO_3)(P_2O_5), V_2O_5, V_4O_9$ | $10^3$ | $(WO_3)(P_2O_5), V_2O_5, V_4O_9$ |
| Mo | $10^4$ | $(M_0O_3)(P_2O_5), V_2O_5$ | $10^4$ | $(M_0O_3)(P_2O_5), V_2O_5$ | $10^3$ | $(M_0O_3)(P_2O_5), V_2O_5, V_4O_9$ |
| Na | $10^8$ | $Na_2O$ | $10^8$ | $Na_2O$ | $10^8$ | $Na_2O$ |
| Cr | $10^8$ | $Cr_2O_3$ | $10^8$ | $Cr_2O_3$ | $10^8$ | $Cr_2O_3$ |
| Fe | $10^8$ | $Fe_2O_3$ | $10^4$ | $Fe_3(PO_4)_2, V_2O_5, V_4O_9$ | $10^4$ | $Fe_3(PO_4)_2, V_2O_5, V_4O_9$ |

According to the present embodiments, in the visual display devices, they can make electron beams thereof less prone to deflection between the glass panels by using the conductive material such as a conductive grass composition to bond glass spacers to glass panels.

What is claimed is:

1. A conductive material comprising a $V_2O_5$—$P_2O_5$ glass and a second phase dispersed in the $V_2O_5$—$P_2O_5$ glass, wherein the second phase contains a crystalline V and O compound and a crystalline metal phosphate compound.

2. The conductive material according to claim 1, wherein the crystalline V and O compound is an oxide selected from the group consisting of $V_2O_5$, $V_4O_9$, $V_2O_4$, and $V_2O_3$.

3. The conductive material according to claim 1, wherein the metal phosphate compound is a phosphate compound of transition metal or alkaline-earth metal.

4. The conductive material according to claim 3, wherein the metal phosphate compound is a phosphate compound containing a metal selected from the group consisting of Zn, Mg, Ca, Ba, Zr, W, Mo, and Fe.

5. The conductive material according to claim 1, wherein the material contains the crystalline V and O compound of 10% or more but not exceeding 50% by volume.

6. The conductive material according to claim 1, wherein the material contains the metal phosphate compound of 10% or more but not exceeding 50% by volume.

7. The conductive material according to claim 1, wherein the material contains $V_2O_5$ of 50% to 70% by weight and $P_2O_5$ of 20% to 40% by weight as components of the $V_2O_5$—$P_2O_5$ glass.

8. A method of producing a conductive material with a crystalline V and O compound and a crystalline metal phosphate compound, by mixing $V_2O_5$—$P_2O_5$ glass with metal oxide combined with phosphoric acid and heating such a mixture.

9. The method of producing a conductive material according to claim 8, wherein the metal oxide is an oxide of transition metal or alkaline earth metal.

10. The method of producing a conductive material according to claim 8, wherein the metal oxide is an oxide containing a metal selected from the group consisting of Zn, Mg, Ca, Ba, Zr, W, Mo, and Fe.

11. The method of producing a conductive material according to claim 8, wherein the material contains $V_2O_5$ of 50% to 70% by weight and $P_2O_5$ of 20% to 40% by weight as components of $V_2O_5$—$P_2O_5$ glass.

12. A visual display device comprising a glass panel with electronic sources, a glass panel with fluorescent material that emits light when receiving electrons emitted from the electron sources, and glass spacers which provide spaces between the glass panels, wherein the glass spacers are bonded to the glass panels with a conductive material containing a $V_2O_5$—$P_2O_5$ glass and a second phase dispersed in the $V_2O_5$—$P_2O_5$ glass, and wherein the second phase contains a crystalline V and O compound and a crystalline metal phosphate compound.

13. The visual display device according to claim 12, wherein the electric resistivity of the conductive material is 10 $\Omega$cm or more but not exceeding $10^9$ $\Omega$cm.

14. The visual display device according to claim 12, wherein the glass transition point of the conductive material which bonds one end of the glass spacer is different from the glass transition point of the conductive material which bonds the other end of the glass spacer.

15. A glass spacer for a visual display device, which is interposed between a glass panel with electron sources and a glass panel with fluorescent material that emits light when receiving electrons emitted from the electron sources, wherein the glass spacer is bonded to the glass panels with a conductive material comprising a $V_2O_5$—$P_2O_5$ glass and a second phase dispersed in the $V_2O_5$—$P_2O_5$ glass, wherein the second phase contains a crystalline V and O compound and a crystalline metal phosphate compound.

* * * * *